United States Patent [19]

Bauer

[11] Patent Number: 5,684,695

[45] Date of Patent: Nov. 4, 1997

[54] METHOD AND APPARATUS FOR CONSTRUCTING AN ENVIRONMENT MAP OF A SELF-PROPELLED, MOBILE UNIT

[75] Inventor: Rudolf Bauer, Neubiberg, Germany

[73] Assignee: Siemens Aktiengesellschaft, Munich, Germany

[21] Appl. No.: 401,968

[22] Filed: Mar. 10, 1995

[30] Foreign Application Priority Data

Mar. 11, 1994 [DE] Germany .................... 44 08 329.7

[51] Int. Cl.$^6$ ........................................ G05D 1/00
[52] U.S. Cl. .................. 364/424.027; 364/424.033
[58] Field of Search ..................... 364/424.02, 513, 364/424.027, 424.029, 424.031, 424.032, 424.033, 461, 460; 358/103; 180/167, 168, 169; 318/568.16

[56] References Cited

U.S. PATENT DOCUMENTS

| | | | |
|---|---|---|---|
| 4,751,658 | 6/1988 | Kadonoff et al. | 364/513 |
| 5,006,988 | 4/1991 | Borenstein et al. | 364/424.02 |
| 5,040,116 | 8/1991 | Evans, Jr. et al. | 364/424.02 |
| 5,319,611 | 6/1994 | Korba | 367/98 |

OTHER PUBLICATIONS

Gourley et al., "Sensor Based Obstacle Avoidance and Mapping for Fast Mobile Robots", Robotics and Automation, 1994 IEEE Int: Conf., p. 1306–1311, 1994.
Sartos et al., "Perception Maps for the Local Navigation of a Mobile Robot: A Neural Network Approach," Robotics and Automation, 1994 IEEE Int. Conf., p. 2193–2198, 1994.
Laliberté et al., "Efficient Algorithms for the Trajectory Planning of Redundant Manipulators with Obstacle Avoidance," Robotics & Automation, 1994 IEEE Int. Conf., pp. 2044–2049, 1994.
Schiele et al., "A Comparison of Position Estimation Techniques Using Occupancy Grids", Robotics and Automation, 1994 IEEE Int: Conf., pp. 1628–1634, 1994.
Johann Borestein et al., "The Vector Field Histogram ... ", IEEE Transactions on Robotics and Automation, vol. 7 No. 3, Jun. 1991.
M. Weigl, et al., "Grid–based Mapping for Autonomous Mobil Robot", Robotics and Autonomous System vol. 11 (1993) 13–21.
M. Halbach et al., "Navigation System for Autonomous Mapper Robots", SPIE vol. 1831 Mobil Robots VII (1992).

*Primary Examiner*—Kevin J. Teska
*Assistant Examiner*—Stephen J. Walder, Jr.
*Attorney, Agent, or Firm*—Hill, Steadman & Simpson

[57] ABSTRACT

An improved method and apparatus for constructing a cellularly structured environment map of a self-propelled, mobile unit is provided. Examples of such self-propelled, mobile units are household robots, self-propelled vacuum cleaners and industrial transport vehicles. To this end, a higher increment for the occupancy degree of a currently evaluated cell is selected for near objects. Further, the occupancy degree is also incremented dependent on a velocity. As an additional measure given standstill of the unit, all cells of the environment map that are located within the aperture cone of a wavefront that emanates from the sensor of the mobile unit are modified in terms of their occupancy degree values. Additionally, a blind zone in which grid cells of the environment map experience no modification of the occupancy degree is defined around the mobile unit.

14 Claims, 3 Drawing Sheets

METHOD AND APPARATUS FOR CONSTRUCTING AN ENVIRONMENT MAP OF A SELF-PROPELLED, MOBILE UNIT

BACKGROUND OF THE INVENTION

1. Field of the Invention

The present invention relates generally to self-propelled, mobile units and more particularly to a method and apparatus for constructing an environment map of a self-propelled, mobile unit.

2. Description of the Related Art

Many versatile possibilities for utilizing autonomously-operating mobile units currently exist. Remote reconnaissance probes, mobile units that operate in danger zones, self-propelled industrial vacuum cleaners, transport vehicles in the manufacturing sector, and self-propelled robots are some examples.

In order, however, to be able to carry out a meaningful job in an unknown environment, an autonomous, mobile robot must both construct a reliable map of its work environment in a step-by-step manner, as well as be able to localize itself utilizing this map at any given point in time. As a consequence of the extremely complex and unstructured environments in which such self-propelled units may possibly maneuver, their areas of use are often limited to office and household environments. Since a map of an area of use is generally not available, such a self-propelled unit must be equipped with sensors. The sensors allow the unit to flexibly interact with the environment. Some such sensors are laser range scanners, video cameras and ultrasound sensors.

A specific problem with these mobile units is that the formation of the environment map and the localization of the mobile unit are dependent on one another. As a result, various errors can occur. First, the mobile unit measures the distance it has traversed from its initial position; second, it measures the distance to obstacles with range sensors and enters these obstacles in the environment map as landmarks. Since these errors accumulate and add up over longer distances, meaningful maneuverability of the mobile unit is no longer possible beyond a certain limit.

One method for orienting self-propelled, mobile units in unknown environments involves the unit constructing a two-dimensional grid of its environment and providing individual cells of this grid with occupation values. The occupation values assigned per grid cell represent the occurrence of obstacles in the environment.

U.S. Pat. No. 5,006,988 discloses a method for orienting self-propelled units in grid maps. An environment map of a self-propelled, mobile unit can be produced with ultrasound sensors. In particular, only the grid occupation values of those grid cells of the environment map that are encountered on an axis perpendicular relative to the emitting sensor surface are modified.

SUMMARY OF THE INVENTION

It is an object of the invention to provide a method and an apparatus with which an improved, cellularly structured environment map of a self-propelled, mobile unit can be produced.

A great advantage of the method of the invention lies in the fact that it is not only grid cells that are located on an axis perpendicularly relative to the sensor surface that can be processed with it. On the contrary, all grid cells of the environment map that are located inside an aperture cone of an ultrasound sensor, for example, can have their degree of occupancy influenced by the method of the invention. In particular when the mobile unit is at a standstill, it is thus assured that obstacles located inside the aperture cone of this wavefront emanating from the sensor can be in turn removed from the environment map. This is also true when the obstacles are not encountered on the axis perpendicular to the sensor surface.

Advantageously, the method of the invention also takes into consideration the fact that objects that are detected by a sensor within the aperture cone cannot be exactly entered in the map with respect to their position and their angle.

The method of the invention therefore provides that all those cells that are located on a circular arc segment that has the sensor as its mid-point and the distance of the obstacle as its radius are successively incremented in terms of their degree of occupancy. For example, the degree of occupancy of an arbitrary cell on the circular arc segment is incremented with every measurement that acquires an object.

The method of the invention also advantageously provides that the measuring imprecision of the sensor be incorporated into the cellular map formation of an environment map. In particular, this is achieved in that a blind zone that exists in grid cells of the environment map is not incremented is provided in the proximity of the sensor adjoining this sensor. This has the advantage that obstacles that move toward the sensor due to the movement of the self-propelled, mobile unit cannot be removed from the map due to measuring imprecisions, particularly in the proximity of the mobile unit, due to decrementation of the occupancy values of these cells. Collisions that are based on the measuring imprecision of the sensors can thus no longer occur.

Advantageously, the method of the invention reacts quickly to moving obstacles that enter into the range of observation of a sensor. The increment with which the degree of occupancy of grid cells is incremented is made dependent on how close the obstacle is already located to the self-propelled, mobile unit and on how fast the self-propelled unit thereby moves toward the obstacle. An increment with which the degree of occupancy of a grid cell is occupied is advantageously more greatly increased the faster the self-propelled unit travels here and the closer the detected obstacle is already located.

An apparatus which provides ultrasound sensors at various levels above one another with respect to a floor on which the mobile unit moves is advantageous for the orientation in a real environment. However, objects that stand on legs, for example, can only be recognized as an obstacle 10–20 cm above the floor and are often encountered in real environments. With two sensor levels arranged above one another parallel to the surface of the floor, obstacles close to the floor, as well as at a distance from the floor, can be detected. As a result, an improved evasion of collisions can be assured by processing the two cellular, environment maps that are obtained in this way. This can advantageously occur in that the respectively higher value of a cell of respective environment map is utilized for recognizing obstacles to the self-propelled, mobile unit. The present invention shall be set forth in greater detail below with reference to the figures.

DETAILED DESCRIPTION OF THE PREFERRED EMBODIMENTS

Figure 1:
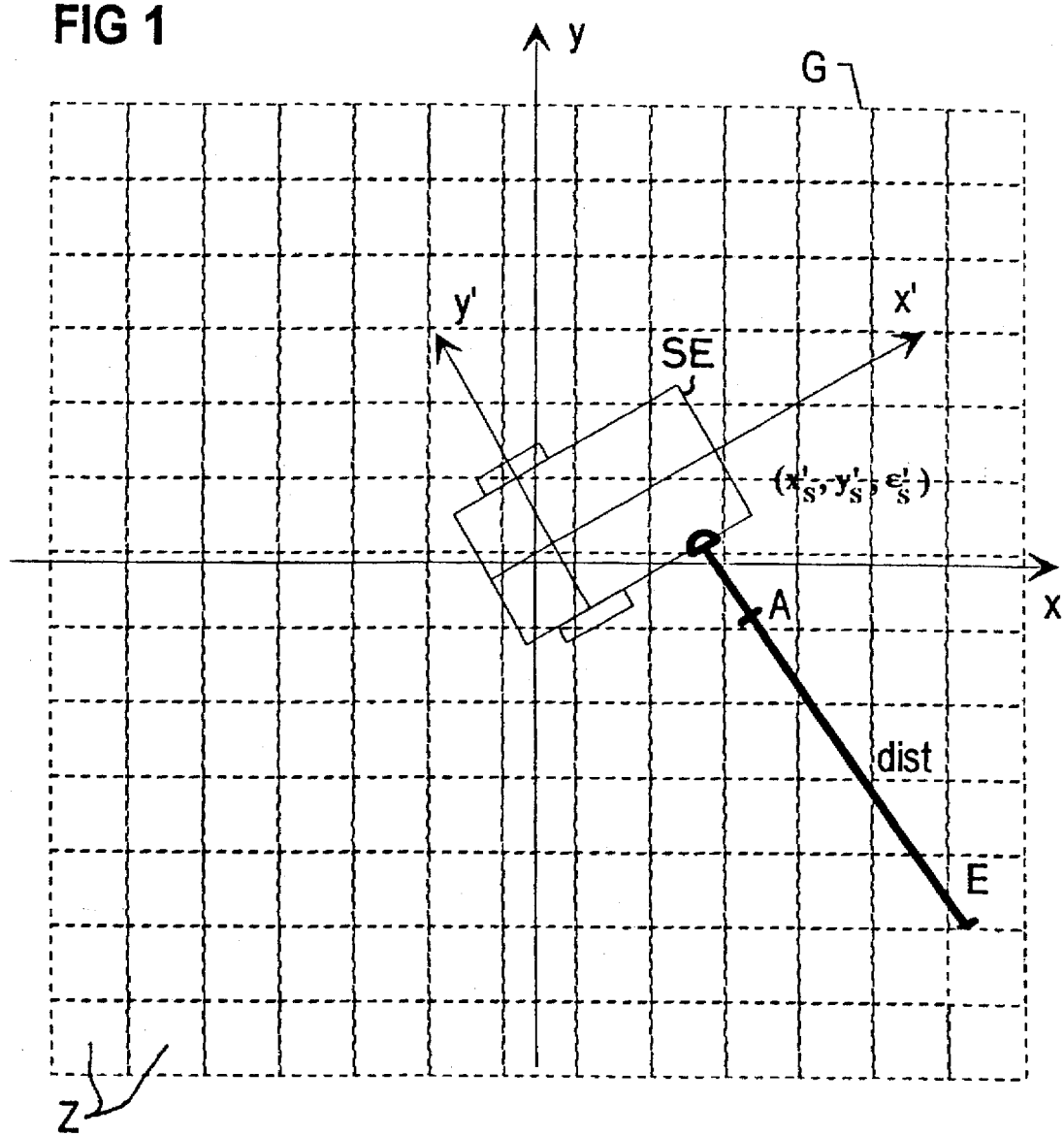
FIG. 1 shows a self-propelled unit in a cellularly structured environment map of the present invention.

FIG. 1 shows a self-propelled, mobile unit SE in a cellularly structured environment map G. The cellularly structured environment map comprises individual cells Z of equal size. A sensor S (see FIG. 2) that is located on the self-propelled mobile unit SE outputs a measuring pulse that is schematically shown here as a straight line.

Examples of such sensors can be ultrasound sensors, sound sensors, infrared sensors or laser sensors. In order to avoid measuring uncertainties and to improve the perception of obstacles that, in particular, are located between the sensor S and a point A, this distance between S and A is defined as a blind zone. What this means is that only those cells that are located between the point A and a point E on a straight line therebetween are modified in terms of their degree of occupancy. Here, for example, an obstacle has been measured in the cell at the point E. This obstacle is assigned the distance, dist, by the sensors. As a rule, such measurements are implemented by sensors that are arranged all around the self-propelled, mobile unit SE. The emission of measuring signals is coordinated such that they do not mutually influence one another in their individual measuring events. Such sensors usually comprise propagation cones having a specific aperture angle which is dependent on the nature of the signal which is specifically transmitted. When a signal is measured within a cone, then the angle at which the measured obstacle occurs in the aperture cone cannot be identified. The standard method of Borenstein presumes that the obstacle is located perpendicularly relative to the sensor surface at the range of the measured distance.

As a result of the method of the invention, however, all cells that are located within the cone are modified in terms of the values of their occupancy degrees. Only those cells that, due to the movement of the self-propelled, mobile unit, move into the blind zone experience no further changes in degree of occupancy. What one thus avoids, for example, is that an obstacle is in turn expunged from the environment map due to movement of the self-propelled, mobile unit and due to mismeasurements in the proximity thereof, being expunged because the values of the degree of occupancy of such a cell are decremented after entry into the blind zone.

The method of the invention provides that obstacles, particularly when the self-propelled, mobile unit is at a standstill, that are located within the aperture cone of a wavefront emanating from the sensor and that are not arranged on an axis perpendicular to the surface of the sensor can be removed from the cellularly structured environment map G. For example, this can be provided in terms of software such that the angle that the distance AE describes with the sensor surface, i.e., for example, with the housing edge of the self-propelled unit SE is modified by software, so that this distance always passes through different cells of the environment map dependent on the measuring cycles in conjunction with the production of the environment map. Thus, cells that are always different are acquired dependent on a measuring cycle and their occupancy values are incremented or, respectively, decremented.

Figure 2:
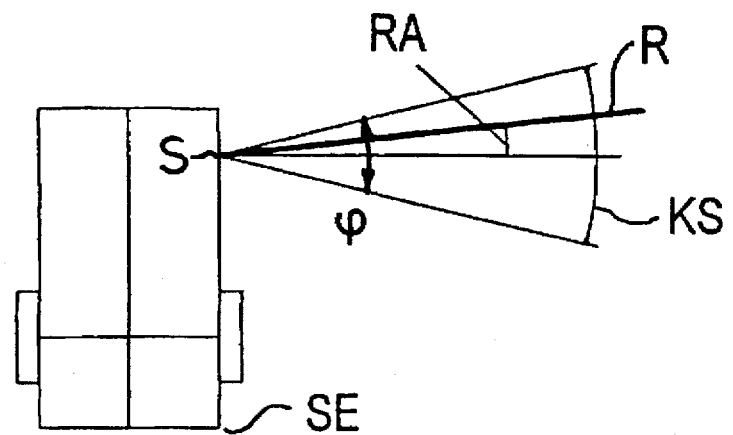
FIG. 2 shows a self-propelled unit of the present invention during the measuring event.

FIG. 2 shows a self-propelled, mobile unit SE during a measuring event. For example, a sensor S outputs a wavefront that is reflected by an obstacle on the circular arc segment KS. The aperture cone of the wavefront that emanates from this sensor is for example, $\phi$. In standard methods, only the occupancy degrees of those cells of the grid map that are located on arc segment KS and perpendicularly relative to the sensors would be incremented. The degrees of occupancy of those grid cells that are not located on arc segment KS and perpendicularly relative to S would be decremented. All other cells of the environment map within the aperture cone would not be influenced. In the method of the invention, the measuring angle of the sensor is varied, for example, by way of software. This measuring angle is described, for example, as RA. A different measuring angle RA is set with every measuring cycle such that it fluctuates within the limits defined by $\phi$ and such that a measuring beam that emanates from the sensor can cover all cells that are located inside this aperture cone of the wavefront. It is thereby advantageously assured that obstacles that are located inside the aperture cone upon standstill can in turn be expunged from the environment map even without having the self-propelled, mobile unit SE move, being expunged insofar as they have been removed from this aperture cone and are not encountered on an axis perpendicularly relative to the sensor.

Figure 3:
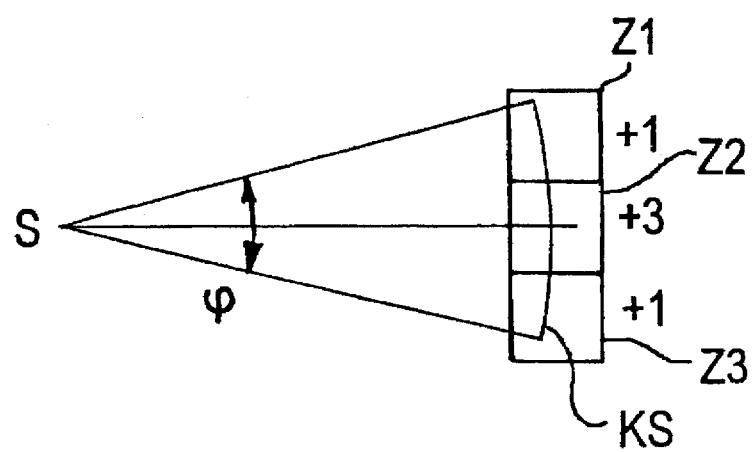
FIG. 3 shows an example of the incrementation of the degree of occupancy of the present invention.

By way of example, FIG. 3 shows an aperture cone of a wavefront of a sensor S that comprises the angle $\phi$. Three cells Z1–Z3 of the cellularly structured environment map are intersected here, for example, by the circular arc segment KS. The cell Z1 is incremented here by the increment +1 and the cell Z2 that is located on a beam that emanates perpendicularly relative to the sensor surface is given the increment +3. The cell Z3 is likewise given the increment +1. When this measurement occurs during a standstill of the mobile unit, then the values of all cells that are located on the circular arc can have their degree of occupancy incremented dependent on the differently implemented measuring cycles of the sensor measuring means.

Figure 4:
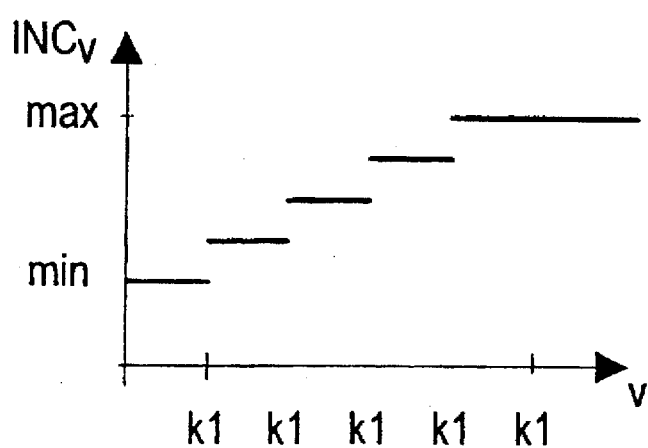
FIG. 4 indicates the qualitative relationship between degree of occupancy, speed and distance of the present invention.
Figure 4:
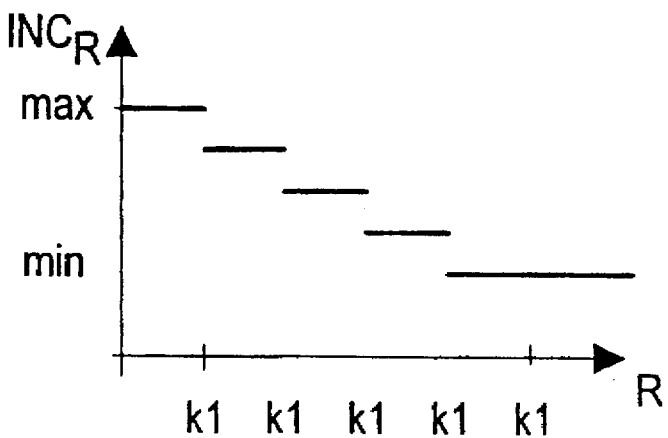

FIG. 4 indicates the qualitative relationship between a measured velocity, the distance of a detected object in the environment map and a prescription for the value of the increment for the modification of the occupancy degrees in the grid cells of the environment map.

In FIG. 4a, the increment value $INC_v$ of the occupancy degree is shown dependent on a velocity v. Reference is made here to an obstacle that enters into an environment map and toward which the self-propelled, mobile unit moves with a velocity V. The grid cell which contains the environmental object in its occupancy approaches the self-propelled, mobile unit with the vector sum of its inherent velocity and the velocity of the self-propelled unit. It is important for following processing events for evading obstacles to give a higher priority to such an obstacle that, close to the self-propelled mobile unit, moves toward the latter at a high speed. This is achieved here, for example, in that the increment $INC_v$ is assigned between a minimum, min, and a maximum, max, dependent on the velocity v. A high increment for the occupancy degree of a cell which indicates the whereabouts of the moving object is allocated here to a high velocity v.

FIG. 4b shows the qualitative relationship of an increment $INC_R$ for the occupancy degree of a grid cell of the environment map and the measured distance R of the object. In order to have better initial data available here for following processes of the method, for example a procedure for invading obstacles, an object that, for example, is located close to the self-propelled, mobile unit is weighted higher than an object that appears at a great distance therefrom and is detected. When a sensor detects an object having the distance R in the proximity of the self-propelled, mobile unit, namely, then the grid location to be occupied has an increment value $INC_R$ of, for example, max allocated to it. When, however, an object is detected at a great distance, for example at the measuring limit of the sensor, then the cell is incremented with an occupancy degree increment $INC_R$ of, for example, min.

Objects measured in the near range or objects that move quickly toward the self-propelled, mobile unit are given a higher priority in the evaluation procedures of the method of the invention and can thus be simply achieved and without great calculating outlay.

Although other modifications and changes may be suggested by those skilled in the art, it is the intention of the inventor to embody within the patent warranted hereon all changes and modifications as reasonably and properly come within the scope of his contribution to the art.

I claim:

1. Method for producing a cellularly structured environment map of a self-propelled, mobile unit which orients itself in the environment with the assistance of sensors based on wave reflection, said method comprising the steps of:

measuring a distance using a sensor in at least one measuring cycle, said distance being between the sensor and an environmental object and a position thereof being defined in a number of first cells located on a circular arc segment with the sensor as mid-point of the arc and the distance as radius, whereby the circular arc segment is limited by the aperture angle of a conical wavefront emanating from the sensor;

arbitrarily selecting one of the first cells;

positively incrementing the occupancy degree of the selected first cell, when an environmental object is present, lying on the circular arc segment dependent on the respective measuring cycle; and negatively incrementing the occupancy degree, insofar as such an occupancy degree is present, of at least one second cell that is located within the circular sector that is defined by the aperture angle of the wavefront and the circular arc segment.

2. Method according to claim 1, further comprising the steps of:

defining a blind zone that adjoins the sensor in the measuring direction of at least one sensor dependent on a measuring imprecision of the sensor such that the occupancy degree of a cell of the environment map which is located within the blind zone is not modified.

3. Method according to claim 1, wherein the increment with which the occupancy degree is incremented is dependent on the distance of the environmental object from the mobile unit.

4. Method according to claim 3, further comprising the step of:

selecting a greater increment for a relatively small distance than for a greater distance.

5. Method according to claim 1, whereby the increment is dependent on a locomotion velocity of the serf-propelled, mobile unit.

6. Method according to claim 5, further comprising the step of:

selecting a greater increment for a relatively high locomotion velocity than for a lower locomotion velocity.

7. Method according to claim 1, further comprising the step of:

producing at least two cellularly structured environment maps representing the environment at different heights of the self-propelled, mobile unit.

8. A method for producing a cellularly structured environment map of a self-propelled, mobile unit which orients itself in the environment with the assistance of sensors based on wave reflection, said method comprising the steps of:

measuring a distance using a sensor in at least one measuring cycle of a plurality of measuring cycles, said distance being between the sensor and an environmental object and a position thereof being defined in a plurality of cells located on a circular arc segment with the sensor as mid-point of the arc and the distance as radius, whereby the circular arc segment is limited by the aperture angle of a conical wavefront emanating from the sensor;

arbitrarily selecting one of the first cells;

positively incrementing an occupancy degree of the selected first cell, when an environmental object is present, lying on the circular arc segment dependent on a respective measuring cycle of the plurality of measuring cycles; and negatively incrementing the occupancy degree, insofar as such an occupancy degree is present, of cells other than the selected first cell that is located within the circular sector that is defined by the aperture angle of the wavefront and the circular arc segment.

9. The method according to claim 8, wherein the increment is dependent on a locomotion velocity of the self-propelled, mobile unit.

10. The method according to claim 9, further comprising the step of:

selecting a greater increment for a relatively high locomotion velocity than for a lower locomotion velocity.

11. The method according to claim 9, further comprising the step of:

producing at least two cellularly structured environment maps representing the environment at different heights of the self-propelled, mobile unit.

12. The method according to claim 8, further comprising the steps of:

defining a blind zone that adjoins the sensor in the measuring direction of at least one sensor dependent on a measuring imprecision of the sensor such that the occupancy degree of a cell of the environment map which is located within the blind zone is not modified.

13. The method according to claim 8, wherein the increment with which the occupancy degree is incremented is dependent on the distance of the environmental object from the mobile unit.

14. The method according to claim 13, further comprising the step of:

selecting a greater increment for a relatively small distance than for a greater distance.

* * * * *